Patented June 6, 1944

2,350,376

UNITED STATES PATENT OFFICE 2,350,376

PROCESS FOR THE PREPARATION OF ALLOXAZINES AND ISOALLOXAZINES

Max Tishler, Rahway, N. J., and Gustaf H. Carlson, Pearl River, N. Y., assignors to Merck & Co., Inc., Rahway, N. J., a corporation of New Jersey No Drawing. Application August 28, 1941, Serial No. 408,662

10 Claims. (Cl. 260—211)

This invention relates to processes for the preparation of alloxazines and iso-alloxazines.

We have discovered that amino-azo compounds which contain the grouping

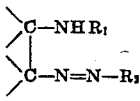

where $R_1$ may be hydrogen, alkyl, polyhydroxy alkyl, or polyacyloxyalkyl, and $R_2$ may be an aromatic radical or a substituted aromatic radical, will react with barbituric acid to form heterocyclic compounds containing the grouping

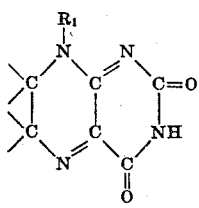

except when $R_1$ is hydrogen, in which case the compound formed contains the grouping

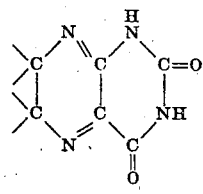

According to our invention, the amino-azo compound employed in the reaction may be selected from a wide variety of such compounds wherein other substituents may be present, the limitation being that the amino and the azo groups are attached to adjacent carbon atoms. Thus, the carbon atoms other than $R_1$ and $R_2$ of the amino-azo reactant may be part of an aliphatic compound, a heterocyclic compound, an aromatic compound, hydroaromatic or a heterocyclic aromatic compound such as quinoline, pyridine, etc. When these carbon atoms of the azo-amine reactant are part of an aromatic ring, the product resulting from the reaction with barbituric acid is an alloxazine or an iso-alloxazine.

The condensation proceeds most readily in acid medium. For example, acetic acid has been found to be a convenient solvent.

The following examples illustrate methods of carrying out the present invention, but it is to be understood that these examples are given by way of illustration and not of limitation.

Example I

Five grams of p-nitroaniline in 30 cc. of concentrated hydrochloric acid and 10 cc. of water are diazotized with 2.5 grams of sodium nitrite at 10° C. Sufficient water is then added to keep the mixture in solution.

The above solution is added dropwise to 4.4 gms. of 1,2-dimethyl-4-aminobenzene in 50 cc. of ethanol at 10° C. A brick-red solid separates during the addition and after all the diazonium salt is added, the precipitate is filtered off. The product, 1,2-dimethyl-4-amino-5-paranitrophenylazobenzene is purified by recrystallizing from propyl alcohol. Melting point with dec. 144° C.

A mixture of 200 milligrams of 1,2-dimethyl-4-amino-5-paranitrophenylazobenzene, 200 milligrams of barbituric acid, 200 milligrams of boric acid and 20 cc. of acetic acid is boiled for three hours. Within five minutes, a solid separates. This solid gradually goes into solution. After three hours, the reaction mixture is cooled at 10° C. for 24 hours. The solid which separates is filtered, and washed well with water and methanol. The yellow residue is recrystallized from hot 50% acetic acid.

Example II

A mixture of 1 gram of 1,2-dimethyl-4-methylamino-5-p-nitrophenylazobenzene (prepared by the coupling of 1,2-dimethyl-4-methylaminobenzene with p-nitrophenyldiazonium chloride) 1 gram of boric acid, 1 gram of barbituric acid and 20 cc. of acetic acid is boiled for six hours. Within a short time, a brick-red solid separates from the reaction mixture, but on prolonged boiling, gradually goes into solution. The mixture is then concentrated to dryness under reduced pressure and washed with large amounts of 5% acetic acid. The residue is recrystallized from 50% acetic acid, and 0.63 gram of pure lumiflavin are obtained.

Example III

A mixture of two grams of 1,2-dimethyl-

4(N-d,1-ribitylamino) - 5 - phenylazobenzene, 2 grams of barbituric acid, 2 grams of boric acid and 50 cc. of glacial acetic acid is boiled for two hours. The mixture is then concentrated to dryness under reduced pressure.

The residue is washed well with methanol, then with cool water, and dissolved in a minimum amount of boiling water containing 0.1% acetic acid. To the hot solution is added 1 gram of activated charcoal, and the mixture is filtered. On standing at 6° C., fairly pure riboflavin separates out.

Alternatively, the above said solid residue is suspended in 300 cc. of water and the mixture is extracted with 85% phenol. The phenol layer is separated, and washed with water. 500 cc. of water are added to the phenol solution, and three volumes of ether are added. After shaking, the riboflavin is present in the aqueous layer. The latter is treated with one gram of activated charcoal, filtered, and concentrated under reduced pressure until incipient crystallization is reached. After standing for 24 hours at 6° C., the product is separated by filtration. The weight of crude product is 1.25–1.5 grams. It is purified by recrystallization from boiling water containing 0.1% acetic acid.

*Example IV*

A mixture of 50 grams of boric acid, 30 grams of barbituric acid, 50 grams of p-nitrophenylazo-tetraacetyl-ribityl-xylidin and 800 cc. of glacial acetic acid is heated with stirring to the boiling point for five hours. The resulting red solution is cooled to room temperature and allowed to stand for 45 hours. 28.8 grams of a brownish yellow solid is filtered off, and washed with about 50 cc. of glacial acetic acid. The combined filtrate and washing are distilled in vacuo (bath temperature 75° or below) to dryness. The residue is triturated with 1500 cc. of chloroform and 200 cc. of water until all except the amorphous solid has dissolved. The aqueous phase is separated, extracted with two 100 cc. portions of chloroform, and the insoluble amorphous product is separated from the aqueous suspension by centrifuging. The solid is then extracted twice with 100 cc. portions of chloroform. The chloroform liquors are combined, dried with anhydrous sodium sulfate, and distilled to dryness in vacuo. The residue is suspended in 300 cc. of isopropanol, permitted to stand for 36 hours, separated by centrifuging, and again suspended in 300 cc. of isopropanol for 24 hours and centrifuged. The solid product is then suspended in 400 cc. of absolute ether, permitted to stand for a few hours, and centrifuged. The yield of crude riboflavin tetraacetate is 20.5 grams.

Ten grams of the crude product are dissolved in 600 to 700 cc. of hot isopropanol, the solution treated with 1 to 2 grams of norite, and cooled, whereupon 6.7 grams of pure riboflavin tetraacetate separates. Melting point 240° with decomposition.

*Example V*

Five grams of 1,2-dimethyl-4-(N-d,1-ribitylamino)-5-phenylazobenzene, 5 grams of barbituric acid and 30 cc. of acetic acid, are stirred at 95° C. for one hour. The temperature is then lowered to 50° C., and the mixture is stirred for ten hours at that temperature. During this heating, the product separates, and at the end of ten hours at 50° C., the mixture is filtered, washed with methanol, and then with water. The crude product weighs about 3.5–3.6. On recrystallization, a pure product (riboflavin) is obtained, as indicated by analyses, specific rotation, and micro-biological assays.

Modifications may be made in carrying out the present invention without departing from the spirit and scope thereof, and we are to be limited only by the appended claims.

We claim:

1. The process which comprises reacting 1,2-dimethyl-4-methylamino-5-paranitrophenylazobenzene with barbituric acid, in a weak acid medium, to form 6,7,9-trimethylisoalloxazine.

2. The process which comprises reacting 1,2-dimethyl-4-ribitylamino - 5 _ phenylazobenzene with barbituric acid, in a weak acid medium to form 6,7-dimethyl-9-ribitylisoalloxazine.

3. The process which comprises reacting 1,2-dimethyl - 4 - tetraacetylribitylamino-5-paranitrophenylazobenzene with barbituric acid, in a weak acid medium to form 6,7-dimethyl-9-tetracetylribitylisoalloxazine.

4 The process which comprises reacting 1,2-dimethyl-4-ribitylamino-5-phenylazobenzene with barbituric acid, in a mixture of boric and acetic acids to form 6,7-dimethyl-9-ribitylisoalloxazine.

5. The process which comprises reacting 1,2-dimethyl-4-ribitylamino-5-phenylazobenzene with barbituric acid, in a hot mixture of boric and acetic acids to form 6,7-dimethyl-9-ribitylisoalloxazine.

6. The process which comprises reacting 1,2-dimethyl -4-tetraacetylribitylamino-5-paranitrophenylazobenzene with barbituric acid, in a mixture of boric and acetic acids to form 6,7-dimethyl-9-tetracetylribitylisoalloxazine.

7. The process which comprises reacting 1,2-dimethyl -4-tetraacetylribitylamino-5-paranitrophenylazobenzene with barbituric acid, in a hot mixture of boric and acetic acids to form 6,7-dimethyl-9-tetraacetylribitylisoalloxazine.

8. The process that comprises reacting barbituric acid with a compound of the formula:

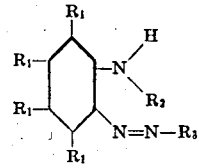

wherein $R_1$ is selected from the group consisting of hydrogen, alkyl, and aryl; $R_2$ is selected from the class consisting of hydrogen, alkyl, polyhydroxyalkyl, and polyacyloxyalkyl; and $R_3$ is an aryl group; to form a substance selected from the class consisting of (1) compounds of the formula:

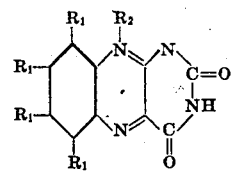

and (2) compounds of the formula:

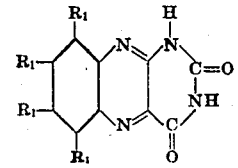

$R_1$ and $R_2$ having the meaning in each formula as before indicated.

9. The process that comprises reacting in a weak acid medium barbituric acid with a compound of the formula:

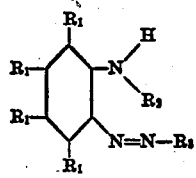

wherein $R_1$ is selected from the group consisting of hydrogen, alkyl, and aryl; $R_2$ is selected from the class consisting of hydrogen, alkyl, polyhydroxyalkyl, and polyacyloxyalkyl; and $R_3$ is an aryl group; to form a substance selected from the class consisting of (1) compounds of the formula:

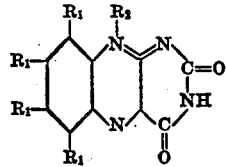

and (2) compounds of the formula:

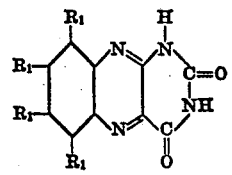

$R_1$ and $R_2$ having the meaning in each formula as before indicated.

10. The process that comprises reacting in an acid medium comprising acetic acid barbituric acid with a compound of the formula:

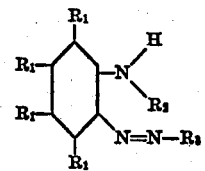

wherein $R_1$ is selected from the group consisting of hydrogen, alkyl, and aryl; $R_2$ is selected from the class consisting of hydrogen, alkyl, polyhydroxyalkyl, and polyacyloxyalkyl; and $R_3$ is an aryl group; to form a substance selected from the class consisting of (1) compounds of the formula:

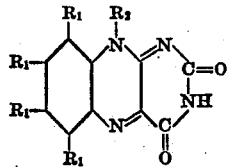

and (2) compounds of the formula:

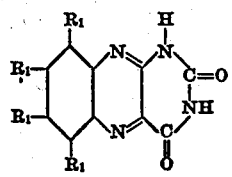

$R_1$ and $R_2$ having the meaning in each formula as before indicated.

MAX TISHLER.
GUSTAF H. CARLSON.